United States Patent

[11] 3,600,658

| [72] | Inventor | Masateru Kuniyoshi<br>Yokohama-shi, Japan |
|---|---|---|
| [21] | Appl. No. | 727,961 |
| [22] | Filed | May 9, 1968 |
| [45] | Patented | Aug. 17, 1971 |
| [73] | Assignee | Tokyo Shibaura Electric Co., Ltd.<br>Kawasaki-shi, Japan |
| [32] | Priority | May 15, 1967 |
| [33] | | Japan |
| [31] | | 42/30524 |

[54] BRUSHLESS MOTOR INCLUDING FORCED COMMUTATION RESPONSIVE TO ROTOR MOVEMENT
2 Claims, 2 Drawing Figs.

[52] U.S. Cl. .................................................. 318/254,
318/439, 318/175, 318/138
[51] Int. Cl. ................................................... H02k 29/00
[50] Field of Search ........................................... 318/138,
254, 327, 175; 323/5

[56] References Cited
UNITED STATES PATENTS

| 3,321,697 | 5/1967 | Etter | 321/45 (C) |
| 3,340,453 | 9/1965 | Bradley et al. | 321/45 (C) |
| 3,509,440 | 4/1970 | Johnston | 318/227 |
| 3,262,036 | 7/1966 | Clarke et al. | 318/227 X |
| 3,354,370 | 11/1967 | Corry et al. | 318/227 |
| 3,406,325 | 10/1968 | Rosa | 318/227 X |
| 3,414,800 | 12/1968 | Sheldrake et al. | 318/327 X |
| 3,423,662 | 1/1969 | Schlabach | 318/227 X |
| 3,430,123 | 2/1969 | Corry et al. | 318/227 |

*Primary Examiner*—G. R. Simmons
*Attorney*—George B. Oujevolk

ABSTRACT: A brushless motor having substantially the same properties as those of a direct current motor and formed from a combination of thyristors included in a bridge inverter and a synchronous motor, wherein there is provided a diode bridge connected to the AC side of the inverter by means of Graetz connection for use as a bypass circuit for the back electromotive force occurring in the armature of the synchronous motor, and that there is also provided an auxiliary thyristor between the respective inverter buses and each of a pair of common contacts disposed opposite thereto thereby effectively to actuate the bypass circuit only at the time of commutation.

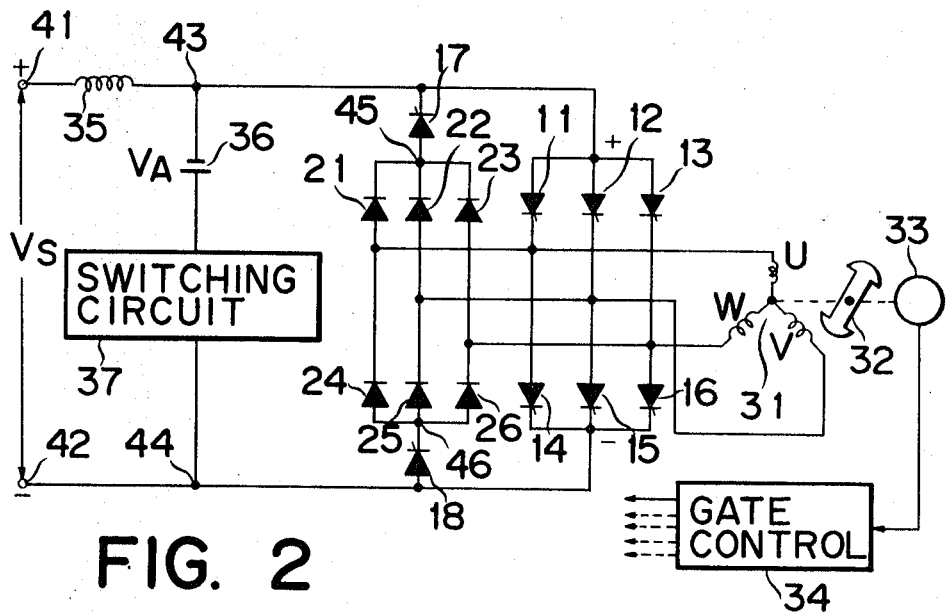

BRUSHLESS MOTOR INCLUDING FORCED COMMUTATION RESPONSIVE TO ROTOR MOVEMENT

The present invention relates to a brushless motor operable by an electric valve, and more particularly to a brushless motor provided with a forced commutation means for forcedly carrying out commutation in the electric valve.

The present invention particularly relates to improvement in a brushless motor of the type using an inverter actuated by a constant current source of DC power and controlled in response to the rotor position, creating a magnetic field for a rotor by exciting an armature with outputs from the inverter thereby to generate a synchronous torque in the rotor, and further assuring the proper function of the inverter by controlling the turn-on of a plurality of electric valves known as controlled rectifiers or thyristors. The problem with such brushless motor is how the thyristor can best be commutated. The most primitive method is by natural commutation whereby commutation is carried out by a back electromotive force generated in an armature. This natural commutation method is indeed excellent in that there is no need to set up any extra commutation means. But it is only capable of carrying out commutation when there is obtained a sufficient amount of back electromotive force for commutation across the thyristors, so that it often fails to carry out commutation at the start as well as under a heavy load. Of the back electromotive force of the armature, the portions occurring across the respective coil phases which are available for commutation are proportional to the sine value of the commutation leading angle $\gamma$. The commutation leading angle $\gamma$, namely, the leading angle of the current of the armature relative to the voltage thereof and the torque T generated in a rotor have a relative of $T\alpha \cos\gamma$. Thus, the smaller the absolute value of $\gamma$, the more elevated will be efficiency and the more reduced will be the speed fluctuations. However, since the back electromotive force is proportional to the sine value of $\gamma$, the selection of a desirable value of $\gamma$ is difficult due to the restriction imposed by the relation with the torque T. Therefore, to broaden the range of selecting the value of $\gamma$, there has come into common use a forced commutation method of forcedly impressing a voltage across the anode and cathode of the electric values in an opposite direction. In this case, there is provided a bypass circuit to quickly eliminate the electromagnetic energy of the armature coil which was excited for commutation up to that time, for example, the so-called return diodes to return said electromagnetic energy to the power source side. However, the provision of such bypass circuit resulted in various inconveniences, though they varied with its construction. For instance, when there was used a bridge inverter provided with a return diode circuit having the so-called Graetz connection, then there were encountered the undermentioned difficulties. Namely, to supply an inverse voltage to the thyristor, the voltage impressed on a main inverter circuit from the forced commutation circuit was required to be higher than that of the DC power conducted to the inverter. As a result, the member such as a thyristor on which the inverse voltage was to be impressed for forced commutation was required to withstand a high voltage. Also, the main power source was shifted to a substantially constant voltage type, though it should have been a constant current type. Further, the thyristors other than a predetermined one which did not need an extinction of arc in commutation also had to be subjected to such extinction.

Generally speaking, the present invention contemplates an improvement in a brushless motor formed from a combination of a main circuit for a bridge inverter having electric valves disposed on the positive and negative potential sides and receiving DC power through at least one reactor and a synchronous motor actuated by outputs from the AC side of the main inverter circuit. There is provided a bypass circuit capable of only supplying the electric valves of the main inverter circuit with a current having an opposite polarity to that of these electric valves. At the time of commutation on the positive potential side of the main inverter circuit, the current of only that part of the bypass circuit is allowed to pass which corresponds to the electric valves on the negative potential side, and at the time of commutation on the negative potential side of the main inverter circuit, the current of only that part of the bypass circuit is allowed to pass which corresponds to the electric valves on the positive potential side.

The invention can be more fully understood from the following detailed description when taken in connection with the accompanying drawing in which:

FIG. 1 shows the electrical construction of an embodiment of a brushless motor of the present invention assembled with a three-phase bridge inverter and Y-connection three-phase synchronous motor; and FIG. 2 is a schematic representation, with the rotor position taken as an abscissa, of the turn-on timing of a thyristor according to the embodiment of FIG. 1 and the method of supplying gating signals thereto.

Referring to FIG. 1 showing an embodiment of the present invention, numerals 11, 12, 13, 14, 15 and 16 represent thyristors constituting a main circuit for a known three-phase bridge inverter. To the output terminal of the inverter is connected a Y-connection synchronous motor having an armature 31 and a rotor 32. As shown in FIG. 2, at least one of the thyristors 11, 12 and 13 on the positive potential side and also at least one of another group of thyristors 14, 15 and 16 on the negative potential side are always in a conducted state. For convenience by description, let it be assumed that commutation from the thyristor 15 to the thyristor 16 has been completed. When the rotor is again rotated through an angle of 60° from its position at this time, then commutation is carried from the thyristor 11 to the thyristor 12. Upon further rotation of the rotor through another 60°, commutation will be transferred from the thyristor 16 to the thyristor 14, and so on. Thus the duration in which the thyristors are turned on is one-third of the length of time required for the rotor to make a complete rotation, namely, corresponds to the time the rotor travels through an angle of 120°. Such operation of the main inverter circuit produces a synchronous torque in the rotor 32.

The positive bus of the inverter circuit including a point 43 is connected through a reactor 35 to the positive terminal 41 of a DC power source and the negative bus of the inverter circuit including a point 44 is connected to the negative terminal 42 of a DC power source. The DC power source has a voltage VS. The provision of the reactor 35 may be deemed to mean the same thing as connecting the inverter to a constant-current source of DC power. Where the DC power source consists of a controlled rectifier means to convert power from AC to DC it is preferable to use a reactor 35 having a relatively large value in order to obtain a fully smooth commutation effect. While the reactor 35 may be replaced by a resistor element, there will be the drawback that power loss will be prominent.

Across the points 43 and 44 is provided a forced commutation circuit consisting of an auxiliary DC power source 36 of voltage VA and a switching circuit 37 connected in series. Of course, the polarity of the auxiliary power source is opposite, as illustrated, to that across the terminals 41 and 42. Where the switching circuit 37 comprises a member, for example, a transistor which can be changed by gating signals from the turn-on to the turnoff state, the voltage VA of the auxiliary power source 36 may have an extremely small value. However, since the switching circuit generally comprises thyristors, the voltage VA is allowed to have approximately the same magnitude as the voltage VS so as to turn off the thyristors effectively or without waste of power. For a switching circuit 37 consisting of thyristors, reference may be had, for example, to a paper by Bradley et al. contained in PROC, IEE, VOL. III, No. 11, Nov. 1964, pp, 1833—1846 (though this treatise discusses the functional operation of an induction motor and is essentially different from the apparatus of the present invention).

Numerals 21, 22, 23, 24, 25 and 26 are diodes connected to the output side of the inverter by means of Graetz connection. The point 45, at which the cathodes of the respective phase arms are connected in common, is connected through the thyristor 17 to the positive inverter bus, and the point 46, at which the anodes of the respective phase arms are connected, is connected through the thyristor 18 to the negative inverter bus. The conduction of the thyristors 17 and 18 is controlled by a control device 34. As shown in FIG. 2, the thyristor 17 is ignited at the time of commutation on the negative potential side and the thyristor 18 is ignited at the time of commutation on the positive potential side.

Now let it be assumed that where a motor is rotated at the rated capacity, the commutation leading angle $\gamma$ is set at a level $\gamma=0$ where efficiency is elevated and speed fluctuations are minimized. Also among the thyristors included in the inverter, the units 11 and 15 are turned on and the rest of them remain turned off. When the conduction periods of the thyristors 11 and 15 reach 60° and 120° respectively as shown in FIG. 2, gating signals are supplied from the gate control device 34 to the switching circuit 37 and thyristor 17 to turn them on. Therefore, the voltage across the points 43 and 44 of FIG. 1 is reverted from the power source voltage VS to the auxiliary power source voltage VA, causing the negative DC current, which ran up to that time through the serially connected reactor 35 to the inverter, now to flow through a circuit comprising the auxiliary power source 36 and the switching circuit 37. On the other hand, the current which was carried from the U phase to the V phase of the armature fails immediately to be reduced to zero due to the electromagnetic energy stored in the armature coil and is bypassed to a closed circuit routed as U phase—V phase—diode 22—thyristor 17—thyristor 11—U phase. At the same time, the thyristor 15 is impressed with an inverse voltage approximately as large as VA by the auxiliary power source 36. Since it is easy to extend the period in which a thyristor receives a back bias voltage longer than the time required for the thyristor to be turned off. Upon completion of the time required for the unfailing turnoff of the thyristor, the switching circuit 37 is also brought to an off-condition. Such switching circuit system is already discussed in the aforementioned paper by Bradley et al. and further description thereof is omitted. When the switching circuit 37 is turned off the voltage across the points 43 and 44 is restored to the power source voltage VS. Then the thyristor 16 will be turned on by gating signals from the gate control device 34. On the other hand, the current which ran through a bypass to the thyristor 17 was carried against a back electromotive force, so that it is now gradually reduced to zero, causing the thyristor naturally to be turned off. At this time there is no back electromotive force across the V phase and W phase. However, since the V phase—U phase section is displaced by 60° from the V phase—W phase section, there occurs a back electromotive force in said V phase—U phase section. It will be understood that the back electromotive force produced across the V phase and U phase at this time will have a sufficient magnitude surely to turn off the thyristor 17, even though the value of the commutation leading angle $\gamma$ may vary over an appreciably broad range. Thus when a rotor is further rotated through another 60° from its position when the thyristors 11 and 16 are turned on, the commutation will be transferred from the thyristor 11 to the thyristor 12. As easily inferred from the foregoing description, the bypass circuit for the armature current in this case is routed as U phase—W phase—thyristor 16—thyristor 18—diode 24—U phase. The switching circuit 37 is operated each time the rotor rotates through 60° and the auxiliary thyristors 17 and 18 are actuated alternately.

As described above, the point 45 is connected to the point 43 through the thyristor 17 and the point 46 is connected to the point 44 through the thyristor 18 thereby alternately to turn on these thyristors in commutation. Thus the auxiliary power source voltage VA is effectively impressed only on the thyristor to be turned off in an opposite direction, so that there will be no harmful effect on the constant current property of the DC power source concurrently obtained by the reactor 35.

Replacement of diodes 21, 22, 23, 24, 25 and 26 by thyristors, direct connection of the point 45 to the point 43 and the point 46 to the point 44, supply of gating signals in common to the diodes 21, 22 and 23 on the positive potential side as well as to the thyristor 17 and also in common to diodes 24, 25 and 26 on the negative potential side as well as to the thyristor 18—all these steps will also bring about the same effect as described above.

The aforementioned embodiment relates to a three-phase bridge inverter. However, the present invention is also applicable in bridge inverters comprising multiphase or multithree-phase connections. Thus the invention can be employed in various modifications without changing the object thereof.

While the invention has been described in connection with some preferred embodiments thereof, the invention is not limited thereto and includes any modifications and alterations which fall within the scope of the invention as defined in the appended claims.

What I claim is:

1. A brushless synchronous motor drive arrangement comprising in combination:
   a. an inverter bridge including positive and negative DC busses defining positive and negative DC sides of said inverter bridge;
   b. at least first and second inverter electric valve pairs (11, 14; 12, 15) connected to said busses, the valves of said valve pairs including gate control means and also including corresponding output leads for connection to corresponding armature coils (U, V, W) for rotating a motor rotor, said leads defining the AC side of said inverter bridge;
   c. detection means (33) for detecting the rotary position of said rotor, a control circuit (34) operatively connected to said detection means, said control circuit (34) controlling and being connected to said gate control means of said inverter electric valve pairs;
   d. a forced commutation circuit including a switching circuit (37) operatively connected to and responsive to said control circuit and including DC supply means (36) said switching means (37) and DC supply means (36) being so connected across said positive and negative busses as to supply DC electricity in a direction counter to the flow of electricity in said positive and negative busses in commutation as determined by said control circuit (34);
   e. a bypass circuit including a diode bridge having diode pairs 21, 24; 22, 25) corresponding to said inverter valve pairs, said diode pairs including bypass leads connected to corresponding armature coils as well as to said inverter electric valve pairs on the AC side of said inverter bridge, said diode pairs and said inverter electric valve pairs being thus both connected to said armature coils, however, in opposite polarity; and,
   f. at least one bridge control electric valve pair (17, 18) connected between said positive and negative DC sides of said inverter bridge and said diode bridge, said bridge control electric valve pair being connected in the same polarity as said diodes, whereby, at the time of commutation on the positive side of the inverter bridge, electricity is allowed to pass through only those diodes of the bypass circuit which correspond to the inverter electric valves disposed on the negative side, and at the time of commutation on the negative side of the inverter bridge, electricity is allowed to pass only through those diodes of the bypass circuit which correspond to the inverter electric valves disposed on the positive side of the main inverter bridge so that the electromagnetic energy stored in the armature winding can be eliminated.

2. A brushless synchronous motor drive arrangement as claimed in claim 1, there being at least first, second, and third inverter electric valve pairs connected to said busses, so as to provide a drive of more than two phases.